No. 857,179. PATENTED JUNE 18, 1907.
A. S. JACOLUCCI.
CONFECTIONERY MACHINE.
APPLICATION FILED MAR. 13, 1907.
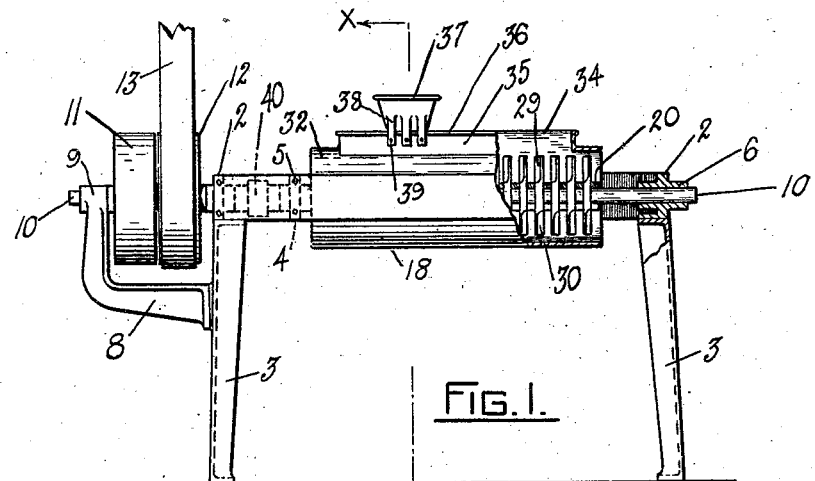
WITNESSES
A.G. Pieczentkowski.
Walter E. Goodwin.
INVENTOR
Alexander S. Jacolucci
By Horatio E. Bellows
ATTORNEY

UNITED STATES PATENT OFFICE.

ALEXANDER S. JACOLUCCI, OF PROVIDENCE, RHODE ISLAND.

CONFECTIONERY-MACHINE.

No. 857,179.  Specification of Letters Patent.  Patented June 18, 1907.

Application filed March 13, 1907. Serial No. 362,209.

*To all whom it may concern:*

Be it known that I, ALEXANDER S. JACOLUCCI, a citizen of the United States, residing at Providence, in the county of Providence and State of Rhode Island, have invented certain new and useful Improvements in Confectionery-Machines, of which the following is a specification, reference being had therein to the accompanying drawing.

My invention relates to confectionery machines; but more particularly to that class known as cream beaters, which are intended to beat up the liquid sugar into a solid cream mass suitable for forming the interior of "chocolates."

The primary purposes of my invention are to provide a machine whose beating parts may be readily removed or replaced for cleaning, changing the color of the cream, repair, or otherwise, without dismantling the machine; further, to increase the efficacy of the beater action in regard to speed of operation and quality of product; and finally, to adapt the machine for propelling the cream in opposite directions.

Other advantages will hereinafter be pointed out and claimed.

To the above ends essentially my invention consists in novel construction and combination of parts hereinafter described, and illustrated in the accompanying drawings wherein, Figures 1 and 2 are front and plan elevations respectively of my new machine, with parts in Fig. 2 broken away. Fig. 3, a section of the same on line *x x* of Fig. 1. Figs. 4 and 5, side and end elevations respectively of one of the beater arms, and Figs. 6 and 7, a side and top plan view respectively of one of the cross bars.

Like reference characters indicate like parts throughout the views.

My machine consists of a rectangular oblong frame, comprising side and end walls, 1 and 2, respectively. The frame is supported by end standards, 3. Near one end of the frame is a transverse bar, 4, fixed to the side walls, 1, by screws, 5. In the end walls, 2, are bearings, 6; and in the bar, 4, a bearing, 7. A bracket arm, 8, fixed to one of the standards, 3, has in its end a bearing, 9. Mounted in bearings, 6, 7 and 9 is a divided driving shaft, 10, carrying pulleys, 11 and 12. A driving belt, 13, connects the pulleys with any convenient source of power. Each of the inner faces of the sides, 1, of the frame is provided with a longitudinal groove, 14, rectangular in cross section, whereby is produced a shoulder, 15. Intermediate the groove, 14, and the top of each wall, 1, the inner face of the latter is provided with a series of vertical channels, 16, producing a series of vertical ribs, 17, An oblong trough, 18, transversely curved, has marginal flanges, 19, adapted to slide endwise into the grooves, 14, and rest upon the shoulders, 15. The trough extends from the bearing, 7, nearly to the end of the frame beneath the beating mechanism hereinafter described. Mounted in the groove or channel, 14, is a series of flat cross-bars, 20, interspaced from each other by the ribs, 17. In detail the cross-bars have each a hub or bearing, 21, midway its length, provided with an oblong curved cavity, 22. The bar ends have lateral T-shaped lugs or extensions, 23. The T-shaped ends of the cross-bars are after the insertion of the trough, 18, slid down through the channels, 16, into the channel, 14, where their lower faces rest upon the flanges, 19 of the trough. The driving shaft, 10, passes through the cavities, 22, of the bearings, 21.

A series of arms or beaters, 25, are mounted on the driving shaft intermediate the cross-bars. In detail, they comprise hubs, 26, in which are set screws, 27, to fix them to the shaft, 10. The body of each beater is nearly lozenge shaped in cross section. That is, the opposite faces of the portion of the arm on one side of the hub is provided with parallel bevels, 29; while the opposite portion of the arm on the other side of the hub has parallel bevels, 30, but oppositely directed to the bevels, 29. When the shaft, 10, rotates, the plane surfaces, 30', of the beaters are adjacent the flat faces of the cross-bars and the beveled faces are working. While the surface, 29, is pushing in one direction, a surface, 30, is pushing in an opposite direction.

Over the beating mechanism is a curved cover, 32, provided with marginal flanges, 33, which is inserted endwise into the frame with its flanges resting upon the lugs, 23, of the bars, 20, and beneath the ends of the ribs, 17. The center of the cover is provided with an oblong rectangular opening, 34, with marginal vertical walls, 35, terminating in marginal beads, 36. A rectangular hopper or funnel, 37, is provided with vertical leteral lugs, 38, upon two opposite sides, in the lower ends of which are inwardly directed screws, 39, which engage the lower parts of the beads, 36. The lugs and screws permit longitudinal adjustment of the funnel to any position relative to the opening, 34. A coupling, 40, is fixed upon the adjacent ends of the split pulley, 10, between the bar, 4, and end wall, 2.

The operation of my machine is as follows: The funnel 37, is adjusted near one end of the opening, 34, and the material to be operated upon poured therethrough, upon the beaters, 35, which operate as already described to thicken and advance the material. The shape and correlation of the beaters and cross bars being such as to act upon the material near the center of the beaters and bars as effectively as at the ends thereof, a result which is not attained by beaters having twisted or propeller shaped blades. The thickened material advances to the end of the housing formed by the trough and cover, and fall therefrom into any desired receptacle. When, as is sometimes the case, it is desired to rebeat the material, the peculiar form of the beaters makes it possible to do so by merely twisting the belt, 13. When for the purpose of repair, cleaning, or coloring it is desirable to have access to the parts of the machine, the cover and trough are slid from the grooves, 14; the screws, 27, of the beaters are loosed; and the shaft, 10, uncoupled, and withdrawn, whereupon the beaters fall out, and the cross-bars are then removed through the channels, 16.

What I claim is,

1. In a machine of the type set forth, the combination with the frame and driving shaft, of a series of bars mounted in the frame, and a series of beater arms provided with oppositely directed beveled portions upon opposite sides of their centers fixed to the shaft and alternately disposed with relation to the bars.

2. In a machine of the type set forth, the combination with the frame and driving shaft, of a series of independently slidable bars mounted in the frame, and a series of beater arms provided with oppositely directed beveled portions upon opposite sides of their centers, fixed to the shaft and alternately disposed with relation to the bars.

3. In a machine of the type set forth, the combination with the frame provided with longitudinal grooves upon its opposite inner faces, of a shaft rotatably mounted in the ends of the frame, a trough slidably mounted in the grooves, transverse bars provided with enlarged ends which rest upon the trough, a cover also slidably mounted in the grooves and resting upon the ends of the bars, and beater arms upon the shaft alternately disposed with relation to the bars.

4. In a machine of the type set forth the combination with the frame, of a cover slidably mounted in the frame and provided with an oblong opening, and a funnel slidably mounted upon the cover above the opening, and means for adjusting the funnel.

5. In a machine of the type set forth, the combination with the frame provided with longitudinal grooves upon its opposite inner faces, of a divided shaft rotatably mounted in the ends of the frame, a trough slidably mounted in the grooves, a series of removable bars traversed loosely by the shaft and resting upon the margins of the trough, a slidable cover whose margins rest upon the ends of the bars, and beater arms removably mounted upon the shaft in alternate relation to the bars.

6. In a machine of the type set forth, the combination with the frame provided with longitudinal grooves upon its opposite inner faces of a shaft rotatably mounted in the ends of the frame, a trough resting in the grooves, transverse bars loosely traversed by the shaft and resting upon the trough, a cover also mounted in the grooves above the bars and provided with an oblong opening in its top a flange upon the margin of the opening of the cover, a funnel slidably mounted upon the flange, means for adjusting the funnel, and beater arms upon the shaft alternately disposed with relation to the transverse bars.

In testimony whereof I have affixed my signature in presence of two witnesses.

ALEXANDER S. JACOLUCCI.

Witnesses:
  HORATIO E. BELLOWS,
  WALTER E. GOODWIN.